US011875625B2

(12) United States Patent
Ihara et al.

(10) Patent No.: US 11,875,625 B2
(45) Date of Patent: Jan. 16, 2024

(54) MONEY PROCESSING SYSTEM, AND METHOD FOR HANDLING AN ERROR IN A MONEY PROCESSING MACHINE

(71) Applicant: GLORY LTD., Himeji (JP)

(72) Inventors: Wataru Ihara, Hyogo (JP); Heisuke Ohno, Hyogo (JP); Kazuya Nishino, Hyogo (JP); Kento Ueda, Hyogo (JP)

(73) Assignee: GLORY LTD., Himeji (JP)

( * ) Notice: Subject to any disclaimer, the term of this patent is extended or adjusted under 35 U.S.C. 154(b) by 169 days.

(21) Appl. No.: 17/226,113

(22) Filed: Apr. 9, 2021

(65) Prior Publication Data

US 2021/0225114 A1 Jul. 22, 2021

Related U.S. Application Data

(63) Continuation of application No. PCT/JP2019/042254, filed on Oct. 29, 2019.

(30) Foreign Application Priority Data

Oct. 30, 2018 (JP) ................................ 2018-204117

(51) Int. Cl.
*G07D 11/235* (2019.01)
*G07D 11/26* (2019.01)
*G08B 6/00* (2006.01)

(52) U.S. Cl.
CPC ........... *G07D 11/235* (2019.01); *G07D 11/26* (2019.01); *G08B 6/00* (2013.01)

(58) Field of Classification Search
CPC ...... G07D 11/235; G07D 11/26; G07D 11/60; G08B 6/00; G07F 19/00
See application file for complete search history.

(56) References Cited

U.S. PATENT DOCUMENTS 7,545,816 B1 * 6/2009 Coutts ...................... G07G 1/14 235/375
9,342,963 B1 * 5/2016 McGraw, IV ...... G06Q 20/3224
(Continued)

FOREIGN PATENT DOCUMENTS

JP 2003-178352 A 6/2003
JP 2004-172667 A 6/2004
(Continued)

OTHER PUBLICATIONS

International Search Report and Written Opinion dated Dec. 24, 2019, received for PCT Application PCT/JP2019/042254, Filed on Oct. 29, 2019, 10 pages including English Translation.

*Primary Examiner* — Sonji N Johnson
(74) *Attorney, Agent, or Firm* — XSENSUS LLP

(57) ABSTRACT

A money processing system includes: a money processing machine including a processing machine communication section and a processing machine controller; a first terminal including a first reception section, a first communication section, and a first controller; and a second terminal including a second reception section, a second communication section, and a second controller. The first terminal is a mobile communication terminal. The processing machine communication section transmits state information indicating a state of the money processing machine. In a case where the first reception section receives a consent operation to handle an error in the money processing machine, the first communication section transmits consent information. The error in the money processing machine is indicated by the state information. The second controller causes the second communication section to receive the consent information.

10 Claims, 3 Drawing Sheets

(56) References Cited

U.S. PATENT DOCUMENTS

| | | | | |
|---|---|---|---|---|
| 2010/0258621 | A1* | 10/2010 | Schlabach | G06Q 10/06 340/5.82 |
| 2013/0102349 | A1* | 4/2013 | Kim | G06Q 10/06 455/517 |
| 2017/0337500 | A1* | 11/2017 | Harwood | G06Q 10/1097 |

FOREIGN PATENT DOCUMENTS

| | | | |
|---|---|---|---|
| JP | 2005-349037 | A | 12/2005 |
| JP | 2006-243382 | A | 9/2006 |
| JP | 2007-199913 | A | 8/2007 |
| JP | 2011-203801 | A | 10/2011 |
| JP | 2013-038723 | A | 2/2013 |
| JP | 2013-117881 | A | 6/2013 |
| JP | 2013-258569 | A | 12/2013 |
| JP | 2017-046153 | A | 3/2017 |
| JP | 2017-107281 | A | 6/2017 |

* cited by examiner

MONEY PROCESSING SYSTEM, AND METHOD FOR HANDLING AN ERROR IN A MONEY PROCESSING MACHINE

CROSS-REFERENCE TO RELATED APPLICATIONS

The present application is a continuation application of International patent Application No. PCT/JP2019/042254, filed on Oct. 29, 2019, claiming priority to Japanese Patent Application No. 2018-204117, filed on Oct. 30, 2018, both of which are herein incorporated by reference in their entirety.

TECHNICAL FIELD

The present disclosure relates to a money processing system, and a method for handling an error in a money processing machine.

BACKGROUND ART

Various techniques have been developed which configure such that in a case where an error occurs in a money handling apparatus, a notification of the error and guidance information for correcting the error are provided to an operator of a bank from the money handling apparatus (see, for example, Patent Literature (hereinafter, referred to as "PTL") 1)

CITATION LIST

Patent Literature

PTL 1
Japanese Patent Application Laid-Open No. 2017-107281

SUMMARY

In order to solve the above-mentioned problem in the related art, a money processing system of the present disclosure includes: a money processing machine including a processing machine communication section and a processing machine controller; a first terminal including a first reception section, a first communication section, and a first controller; and a second terminal including a second reception section, a second communication section, and a second controller. The first terminal is a mobile communication terminal. The first reception section receives an input operation. The first communication section is configured to perform communication. The second reception section receives an input operation. The second communication section is configured to perform communication. The processing machine controller controls the processing machine communication section to transmit state information indicating a state of the money processing machine. In a case where the first reception section receives a consent operation to handle an error in the money processing machine, the first controller controls the first communication section to transmit consent information. The error in the money processing machine is indicated by the state information. The second controller causes the second communication section to receive the consent information.

In order to solve the above-described problem in the related art, a method for handling an error in a money processing machine of the present disclosure includes: transmitting, by a money processing machine, state information indicating a state of the money processing machine; transmitting, by a first terminal, consent information in a case where the first terminal receives a consent operation to handle an error in the money processing machine after reception of the state information; and receiving, by a second terminal, the consent information. The first terminal is a mobile communication terminal. The error in the money processing machine is indicated by the state information.

DESCRIPTION OF EMBODIMENTS

The money handling apparatus is not only operated by an operator, and many money handling apparatuses, such as a money handling apparatus installed in a lobby of a bank, are operated by a customer of a bank. Even when guidance information for correcting an error is provided to a customer who is the operator of a money handling apparatus, the customer may not be able to address the error in a case where the customer is unfamiliar with operation of the money handling apparatus.

The present disclosure has been made to solve such a problem, and has an object to provide a money processing system and a method for handling an error in money handling, which are configured to be capable of quickly handling an error in a money handling apparatus.

According to the present disclosure, it is possible to quickly handle an error in an money handling apparatus.

Hereinafter, a money processing system and a method for handling an error in a money processing machine according to an embodiment of the present disclosure will be described with reference to the accompanying drawings. The embodiment described below is merely exemplary, and does not preclude various modifications and applications of techniques, which are not explicitly described in the embodiment described below. Further, each configuration of the embodiment can be implemented while variously modified without departing from the spirit and scope thereof. Further, each configuration of the embodiment can be selected as needed or can be combined as appropriate.

Note that, in the present embodiment, an example will be described in which the money processing system and the method for handling an error in the money processing machine of the present disclosure are applied to a system in which a banknote processing apparatus is used as the money processing apparatus. As a matter of course, the money processing system and the method for handling an error in the money processing machine of the present disclosure are also applicable to apparatuses that process coins.

Further, the term "rejected money" in the present specification refers to a banknote that cannot be processed by the banknote processing apparatus. Examples of the rejected money include a counterfeit note, and a banknote that is obliquely or overlappingly passed through a recognition section to be described later and therefore cannot be correctly recognized by the recognition section. Note that, the term "money" is a notion that comprises banknotes and coins. Further, the term "banknote" is a notion that comprises banknotes made of paper, banknotes made of resin, and banknotes made of paper and resin.

Further, in all the drawings for describing the embodiment, the same elements are provided as a rule with the same reference signs and descriptions thereof may be omitted.

[1. Configuration]

Figure 1:
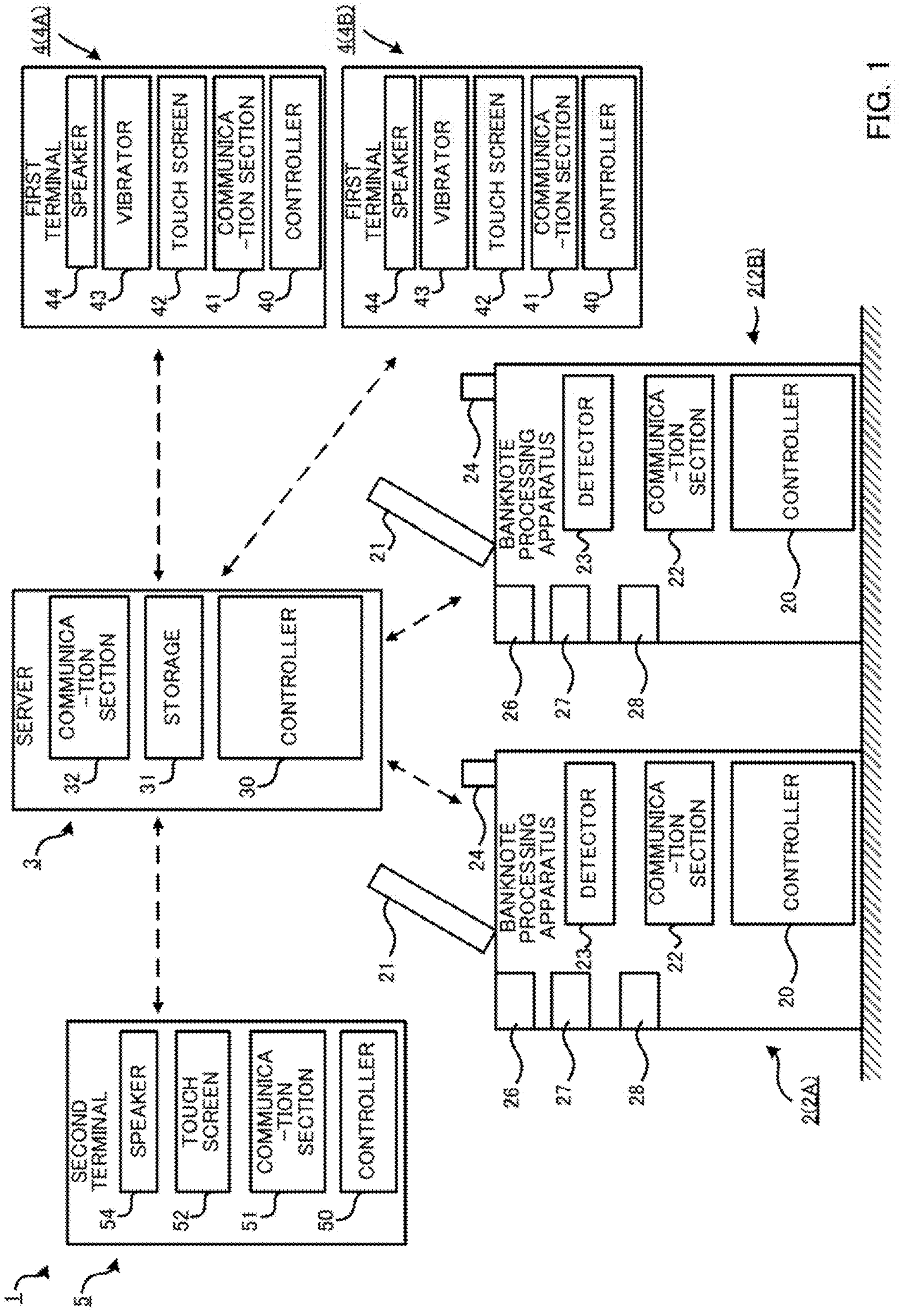
FIG. 1 is a schematic diagram illustrating a configuration of a banknote processing system of an embodiment of the present disclosure.

A configuration of a banknote processing system of an embodiment of the present disclosure will be described with reference to FIG. 1. FIG. 1 is a schematic diagram illustrating the configuration of the banknote processing system of the embodiment of the present disclosure.

[1-1. System]

As illustrated in FIG. 1, a banknote processing system 1 of the present embodiment comprises: a banknote processing apparatus 2 (money processing apparatus), a server 3, a mobile terminal 4 (first terminal), and a terminal 5 (second terminal). In the present embodiment, the banknote processing system 1 comprises two banknote processing apparatus 2A (first money processing apparatus) and banknote processing apparatus 2B (second money processing apparatus) as the banknote processing apparatus 2, and two mobile terminal 4A and mobile terminal 4B as the mobile terminal 4.

[1-2. Banknote Processing Apparatus]

In the present embodiment, the banknote processing apparatus 2 is an apparatus which is disposed in a lobby of a bank and which a customer of the bank himself/herself operates to perform depositing and dispensing processing or the like. For convenience of description, it is assumed, as described above, that only the two banknote processing apparatus 2A and banknote processing apparatus 2B are disposed as the banknote processing apparatus 2 in a lobby of a bank.

The banknote processing apparatus 2 comprises: an inlet 26 into which money is inserted; an outlet 27 from which money is dispensed; a reject port 28 from which rejected money is discharged; and a transport unit (not illustrated) for transporting a banknote to the inlet 26, the outlet 27 or the reject port 28 described above.

The banknote processing apparatus 2 further comprises: a processing machine controller 20; an operation display 21 (processing machine alarm); a processing machine communication section 22; a detector 23 for detecting various errors; and a beacon 24. Hereinafter, the processing machine controller 20 is referred to as "controller 20", and the processing machine communication section 22 is referred to as "communication section 22".

The controller 20 controls each constituent element of the banknote processing apparatus 2 as appropriate based on information input from the operation display 21, the communication section 22, the detector 23 or the like. Specific control by the controller 20 will be described later.

The operation display 21 is, for example, a touch screen, and comprises a display function and an operation reception function. Specifically, the operation display 21 displays various kinds of information such as operation guidance, account information of a customer, and error information Inf_e (state information). Further, the operation display 21 receives an operation of a customer (operator). A customer can give various commands to the controller 20 by operating the operation display 21.

The operation guidance that is displayed on the operation display 21 also comprises guidance (error handling information) for correcting an error that has occurred in the banknote processing apparatus 2. Note that, the term "error" refers to a state in which the banknote processing apparatus 2 is not normal. That is, the "error" comprises not only a failure of the banknote processing apparatus 2, but also an error due to an operation of a customer. Examples of the error due to an operation of a customer comprise a problem in which a customer inadvertently leaves a dispensed banknote in the outlet 27.

The communication section 22 is configured to perform communication with other various kinds of apparatuses. In the present embodiment, the communication section 22 performs two-way communication with the mobile terminal 4 and the terminal 5 via the server 3.

The detector 23 is configured to detect various kinds of information on the banknote processing apparatus 2 and to transmit the detected various kinds of information to the controller 20. Although FIG. 1 illustrates only one detector 23 in the banknote processing apparatus 2 in a simplified manner, the banknote processing apparatus 2 comprises a plurality of detectors 23 configured to detect various information on the banknote processing apparatus 2.

As the detector, a recognition section is comprised, for example. The recognition section recognizes the denomination, authenticity, face/back, fitness, new/old, transport state, and the like of a banknote transported by the transport unit.

In addition, the banknote processing apparatus 2 comprises, as the detector 23, a human detection sensor that detects the presence of an operator of the banknote processing apparatus 2, a banknote sensor that detects a banknote in the outlet 27, a clogging sensor that detects clogging of a banknote at the transport unit, a banknote sensor that detects a banknote in the reject port 28, and the like. Further, the operation display 21 detects the content of an operation performed on the operation display 21, and therefore also serves as the detector 23.

The beacon 24 outputs a signal within a relatively narrow range. When the mobile terminal 4 carried by a bank clerk approaches the banknote processing apparatus 2, the mobile terminal 4 receives a signal of the beacon 24. This will be described in detail later.

Here, the controller 20 will be described again. In a case where the controller 20 determines that an error occurs in the banknote processing apparatus 2, the controller 20 controls the communication section 22 such that the communication section 22 transmits error information Inf_e, and apparatus information ID_m (specific information) of the banknote processing apparatus 2 (that is, the apparatus information ID_m is assigned to the own apparatus) in which the error has occurred, to the server 3. The error information Inf_e is information indicating an error type, and is an error code set for each error type in the present embodiment. The apparatus information ID_m is information specifying the banknote processing apparatus 2.

These pieces of information Inf_e and information ID_m are transmitted to each mobile terminal 4 and the terminal 5 via the server 3, respectively. The controller 20 controls the communication section 22 such that the communication section 22 continuously or intermittently repeatedly transmits information Inf_e and information ID_m, until the communication section 22 receives consent information to be described later from the mobile terminal 4.

In a case where information from each detector 23 satisfies a predetermined condition, the controller 20 determines that an error occurs in the banknote processing apparatus 2.

For example, in a case where clogging of a banknote in the transport unit is detected by the clogging sensor described above, the controller 20 determines that an error occurs. The controller 20 then controls the communication section 22 such that the communication section 22 transmits apparatus information ID_m, and error information Inf_e to the effect that clogging of a banknote has occurred, to the server 3.

Further, in a case where a full state of a storage (not illustrated) of the banknote processing apparatus 2, in which the storage is configured to store a deposited banknote, is detected, that is, in a case where no further banknote can be stored in the storage is detected, the controller 20 determines that an error occurs which does not allow depositing processing to be performed. Further, in a case where it is detected that a door (not illustrated) of the banknote processing apparatus 2 is open before the start of depositing processing, the controller 20 determines that there is no state in which depositing processing of a banknote can be started, that is, the controller 20 determines that an error occurs which does not allow depositing processing to be performed. Further, in a case where a failure of a component (for example, the detector 23) of the banknote processing apparatus 2, in which the component concerns depositing processing, is detected before the start of depositing processing, the controller 20 determines that an error occurs which does not allow depositing processing to be performed. In such a case, the controller 20 then controls the communication section 22 such that the communication section 22 transmits apparatus information ID_m, and error information Inf_e to the effect that depositing processing cannot be performed, to the server 3.

Further, in a case where it is detected that the door (not illustrated) of the banknote processing apparatus 2 is open before the start of dispensing processing, the controller 20 determines that there is no state in which dispensing processing of a banknote can be started, that is, the controller 20 determines that an error occurs which does not allow dispensing processing to be performed. Further, in a case where a failure of a component (for example, the detector 23) of the banknote processing apparatus 2, in which the component concerns the dispensing processing, is detected before the start of dispensing processing, the controller 20 determines that an error occurs which does not allow dispensing processing to be performed. In such a case, the controller 20 then controls the communication section 22 such that the communication section 22 transmits apparatus information ID_m, and error information Inf_e to the effect that the dispensing processing cannot be performed, to the server 3.

Further, in a case where an operator of the banknote processing apparatus 2 is not detected by the human detection sensor described above while a banknote in the outlet 27 is being detected by the banknote sensor described above, the controller 20 determines that an error occurs. The controller 20 then controls the communication section 22 such that the communication section 22 transmits apparatus information ID_m, and error information Inf_e to the effect that the banknote has been left in the outlet 27, to the server 3.

Further, in a case where the controller 20 determines based on information from a reject sensor that a rejection has been repeated a plurality of times within a predetermined time, the controller 20 determines that an error occurs. The controller 20 then controls the communication section 22 such that the communication section 22 transmits apparatus information ID_m, and error information Inf_e to the effect that a customer is repeating the rejection, to the server 3. Note that, in a case where the detector 23 detects, as a deposited banknote, a significantly soiled banknote, a counterfeit note, a banknote whose denomination is other than denominations to be received, or the like, a plurality of rejections is repeated within a predetermined time. The denominations to be received are denominations that are set in advance as denominations to be processed in the banknote processing apparatus 2 concerned.

Further, in a case where the display of the operation display 21 does not change for a predetermined time or longer while displaying an operation in the middle of a depositing and dispensing operation before completion of the depositing and dispensing operation or in a case where the operation display 21 repeatedly receives the same operation a predetermined number of times or more, the controller 20 determines that an error occurs. The controller 20 then controls the communication section 22 such that the communication section 22 transmits apparatus information ID_m, and error information Inf_e to the effect that a customer is confused with an operation.

When the controller 20 determines an occurrence of an error and then determines that the error has been corrected, the controller 20 controls the communication section 22 such that the communication section 22 transmits error correction information Inf_x to the effect that the error has been corrected, to the mobile terminal 4 and the terminal 5 via the server 3. For example, in a case where information from the detector 23 satisfies a predetermined condition, the controller 20 determines an occurrence of an error in the banknote processing apparatus 2, and then the information from the detector 23 deviates from the predetermined condition, the controller 20 determines that the error has been corrected.

For an error whose correction cannot be determined by the controller 20, a bank clerk may determine the correction of the error and operate the mobile terminal 4 (for example, the mobile terminal 4A) such that the mobile terminal 4 transmits information to the effect that the error has been corrected, to the banknote processing apparatus 2. In this case, the controller 20, which has received the information to the effect that the error has been corrected, from the mobile terminal 4A, controls the communication section 22 such that the communication section 22 transmits error correction information Inf_x to the other mobile terminal 4 (for example, the mobile terminal 4B) and the terminal 5.

The error whose correction cannot be determined by the controller 20 is an error which is not due to the banknote processing apparatus 2, and in which, for example, a customer attempts to deposit a heavily soiled banknote and rejections are repeated.

As described above, when a bank clerk carrying the mobile terminal 4 approaches the banknote processing apparatus 2, the mobile terminal 4 receives a signal of the beacon 24. The signal of the beacon 24 is accompanied by apparatus information ID_m of the banknote processing apparatus 2 that comprises the beacon 24. The mobile terminal 4 that has received the signal of the beacon 24 transmits the apparatus information ID_m, and bank clerk information ID_a specifying the bank clerk carrying the mobile terminal 4, to the server 3. Note that, in order to use the mobile terminal 4, it is necessary to input bank clerk information ID_a to the mobile terminal 4 as described later. That is, bank clerk information ID_a is stored in advance in the mobile terminal 4.

The server 3 determines, based on the bank clerk information ID_a and the apparatus information ID_m, whether the bank clerk is authorized to operate the banknote processing apparatus 2 concerned, and transmits a determination result to the banknote processing apparatus 2 concerned. A maintenance door of the banknote processing apparatus 2 is locked by an electronic lock. When the determination result from the server 3 indicates that the bank clerk is authorized to operate the banknote processing apparatus 2, the controller 20 automatically unlocks the electronic lock. Further, when the determination result from the server 3 indicates that the bank clerk is authorized to operate the banknote processing apparatus 2, the operation display 21 may display a release button for an instruction to unlock the electronic lock. Accordingly, the bank clerk can open the maintenance door and easily perform maintenance of the banknote processing apparatus 2. When the determination result from the server 3 indicates that the bank clerk is not authorized to operate the banknote processing apparatus 2, on the other hand, the controller 20 does not unlock the electronic lock, and the bank clerk cannot open the maintenance door and perform maintenance of the banknote processing apparatus 2.

[1-3. Server]

The server 3 comprises a server controller 30, a storage 31, and a server communication section 32. Hereinafter, the server controller 30 is referred to as "controller 30", and the server communication section 32 is referred to as "communication section 32".

The storage 31 stores various kinds of information of customers, such as the identification information ID and passwords of cash cards. Further, the storage 31 stores various kinds of information of bank clerks, such as bank clerk information ID_a and authority of bank clerks described above.

The communication section 32 is configured to perform communication with other various kinds of apparatuses. In the present embodiment, each intercommunication among the banknote processing apparatus 2A, the banknote processing apparatus 2B, the mobile terminal 4A and the mobile terminal 4B, and the terminal 5 is performed via the communication section 32.

When the controller 30 receives information from the mobile terminal 4A, the mobile terminal 4B, and the terminal 5, the controller 30 controls the communication section 32 such that the communication section 32 transmits the information to an appropriate transmission destination. That is, as described above, each mutual transmission and reception among the mobile terminal 4A, the mobile terminal 4B, and the terminal 5 is performed via the server 3. Further, the controller 30 appropriately reads information from the storage 31 as needed, and transmits the information to at least one of the mobile terminal 4A, the mobile terminal 4B, and the terminal 5.

For example, bank clerk information ID_a and apparatus information ID_m are input from the mobile terminal 4 that has received a signal of the beacon 24 as described above, into the server 3 via the communication section 32. The controller 30 reads authority corresponding to the received bank clerk information ID_a from the storage 31, and determines whether the authority authorizes maintenance of the banknote processing apparatus 2 corresponding to the apparatus information ID_m to be performed. The controller 30 then controls the communication section 32 such that the communication section 32 transmits a determination result for the authority to the banknote processing apparatus 2 concerned.

[1-4. Mobile Terminal for Bank Clerk]

The mobile terminal 4 is a mobile communication terminal for general bank clerks who directly address an error in the banknote processing apparatus 2. For convenience of description, it is assumed that only the two mobile terminal 4A and mobile terminal 4B are prepared as the mobile terminal 4 as described above.

In the present embodiment, the mobile terminal 4A is dedicated to a bank clerk A, and the mobile terminal 4B is dedicated to a bank clerk B. Further, in order to use the mobile terminal 4A, it is necessary to input bank clerk information ID_a of the bank clerk A and a password corresponding to the bank clerk information ID_a into the mobile terminal 4A, respectively. Similarly, in order to use the mobile terminal 4B, it is necessary to input bank clerk information ID_a of the bank clerk B and a password corresponding to the bank clerk information ID_a into the mobile terminal 4B, respectively. That is, the bank clerk information ID_a of the bank clerk A is also information specifying the mobile terminal 4A, and the bank clerk information ID_a of the bank clerk B is also information specifying the mobile terminal 4B.

The mobile terminal 4 is a mobile communication terminal, such as a tablet computer, a smart phone or a smart watch, and is a smart phone in the present embodiment.

The mobile terminal 4 comprises a first controller 40, a first communication section 41, a touch screen 42, a vibrator 43, and a speaker 44 built in the mobile terminal 4. Hereinafter, the first controller 40 is referred to as "controller 40", and the first communication section 41 is referred to as "communication section 41".

The communication section 41 is configured to perform communication with other various kinds of apparatuses. In the present embodiment, the communication section 41 performs two-way communication with the banknote processing apparatus 2A, the banknote processing apparatus 2B and the terminal 5 via the server 3.

The touch screen 42 receives various kinds of input operations including a consent operation to be described later, and displays various kinds of information (visual notification) including apparatus information ID_m and error information Inf_e. That is, the touch screen 42 forms both a first reception section and a first alarm of the present disclosure.

The vibrator 43 vibrates the mobile terminal 4, and notifies reception of apparatus information ID_m and error information Inf_e by vibration in a case where these pieces of information are received. The speaker 44 notifies reception of apparatus information ID_m and error information Inf_e by outputting a sound in a case where these pieces of information are received. That is, the first alarm of the present disclosure comprises the vibrator 43 and the speaker 44 in addition to the touch screen 42.

When the communication section 41 receives apparatus information ID_m and error information Inf_e from the banknote processing apparatus 2 (here, the banknote processing apparatus 2A), the controller 40 controls the touch screen 42 such that the touch screen 42 displays these pieces of information ID_m and information Inf_e. In addition, the controller 40 causes the touch screen 42 to display an inquiry Qa as to whether to undertake handling of an error (hereinafter, referred to as "error handling") in the banknote processing apparatus 2 (that is, the banknote processing apparatus 2A) corresponding to the apparatus information ID_m. Further, the controller 40 controls the vibrator 43 and the speaker 44 such that the vibrator 43 and the speaker 44 notify the bank clerk A of reception of apparatus information ID_m and error information Inf_e as described above.

When the touch screen 42 receives an operation to undertake the error handling in the banknote processing apparatus 2A (hereinafter, the operation will be referred to as "consent operation"), the controller 40 then controls the communication section 41 such that the communication section 41 transmits bank clerk information ID_a to the server 3. In addition, when the touch screen 42 receives the consent operation, the controller 40 controls the touch screen 42 such that the display of the inquiry Qa is erased from the touch screen 42.

When the server 3 receives bank clerk information ID_a from the mobile terminal 4 (here, the mobile terminal 4A), the server 3 transmits the bank clerk information ID_a to the banknote processing apparatus 2A, the other mobile terminal 4 that is namely the mobile terminal 4B, and the terminal 5, respectively. Note that, the transmitted bank clerk information ID_a also serves as consent information indicating consent to error handling. Consent information may be transmitted separately from bank clerk information ID_a as a matter of course.

When the banknote processing apparatus 2A receives bank clerk information ID_a, the banknote processing apparatus 2A terminates transmission of apparatus information ID_m and error information Inf_e.

In every other mobile terminal 4 having received bank clerk information ID_a, here, in the mobile terminal 4B, the controller 40 controls the touch screen 42 such that displays of apparatus information ID_m, error information Inf_e, and an inquiry Qa are erased from the touch screen 42. That is, processing of receiving consent to error handling is terminated.

Further, in a case where the touch screen 42 receives a handling completion operation indicating that error handling in the banknote processing apparatus 2A has been completed, the controller 40 transmits error correction information Inf_x to the terminal 5 via the server 3.

Between reception of a consent operation with respect to an error in the banknote processing apparatus 2A by the touch screen 42 and reception of a handling completion operation with respect to the error thereby, the controller 40 does not respond to the other banknote processing apparatus, that is, the banknote processing apparatus 2B. That is, even when the controller 40 receives apparatus information ID_m and error information Inf_e from the banknote processing apparatus 2B, the controller 40 controls the touch screen 42 such that the touch screen 42 does not display these pieces of information.

In addition, in a case where the communication section 41 receives a signal of the beacon 24 of the banknote processing apparatus 2 (here, the banknote processing apparatus 2A), the controller 40 of the mobile terminal 4 (here, the mobile terminal 4A) performs control as described above. That is, the controller 40 controls the communication section 41 such that the communication section 41 transmits the apparatus information ID_m of the banknote processing apparatus 2A and the bank clerk information ID_a of the bank clerk A to the server 3.

[1-5. Terminal for Administrator]

The terminal 5 is a terminal for an administrator. The administrator is a bank clerk who manages the work of general bank clerks who carry the mobile terminal 4 and perform error handling. In order for an administrator to use the terminal 5, it is necessary to input bank clerk information ID_a of the administrator and a password corresponding to the bank clerk information ID_a into the terminal 5. In the terminal 5, the ease of management of displayed information, such as a relatively large screen size, is regarded as more important than the portability in comparison with the mobile terminal 4 used by general bank clerks who perform error handling. The terminal 5 is, for example, a desktop personal computer, a laptop personal computer, a tablet computer or a smart phone, and is a tablet computer in the present embodiment.

The terminal 5 comprises a second controller 50, a second communication section 51, a touch screen 52, and a speaker 54 built in the terminal 5. Hereinafter, the second controller 50 is referred to as "controller 50", and the second communication section 51 is referred to as "communication section 51".

The communication section 51 is configured to perform communication with other various kinds of apparatuses. The communication section 51 performs two-way communication with the banknote processing apparatus 2A, the banknote processing apparatus 2B, the mobile terminal 4A and the mobile terminal 4B via the server 3 in the present embodiment.

The touch screen 52 receives various kinds of input operations, and displays various kinds of information (visual notification) including apparatus information ID_m and error information Inf_e. That is, the touch screen 52 forms both a second reception section and a second alarm of the present disclosure.

When the communication section 51 receives apparatus information ID_m and error information Inf_e from the banknote processing apparatus 2 (here, the banknote processing apparatus 2A), the controller 50 controls the touch screen 52 such that the touch screen 52 displays these pieces of information ID_m and information Inf_e, for example, horizontally. The controller 50 may control the speaker 54 such that the speaker 54 generates a sound notifying reception of apparatus information ID_m and error information Inf_e. That is, the second alarm of the present disclosure may further comprise the speaker 54 in addition to the touch screen 52.

When the communication section 51 thereafter receives the bank clerk information ID_a of the bank clerk A from the mobile terminal 4A, the controller 50 causes the touch screen 52 to display that the bank clerk A performs error handling in the banknote processing apparatus 2A. Specifically, for example, the bank clerk information ID_a of the bank clerk A is further displayed next to the apparatus information ID_m of the banknote processing apparatus 2A and the error information Inf_e of the banknote processing apparatus 2A, which have been previously displayed horizontally on the touch screen 52.

When the communication section 51 further thereafter receives error correction information Inf_x from the mobile terminal 4A, the controller 50 controls the touch screen 52 such that the touch screen 52 displays that an error in the banknote processing apparatus 2A has been corrected or such that each display of the apparatus information ID_m of the banknote processing apparatus 2A and the error information Inf_e on the touch screen 52 of the banknote processing apparatus 2A is deleted.

Ina case where the touch screen 52 does not display any bank clerk who undertakes error handling in the banknote processing apparatus 2A, an administrator may operate the terminal 5 such that the terminal 5 transmits a message requesting handling of the error to the mobile terminal 4B, for example. Alternatively, the controller 50 may control the communication section 51 such that the communication section 51 acquires position information on each mobile terminal 4 and transmits a message requesting handling of the error to the mobile terminal 4 located closest to the banknote processing apparatus 2A.

[2. Processing Flow]

Figure 2:
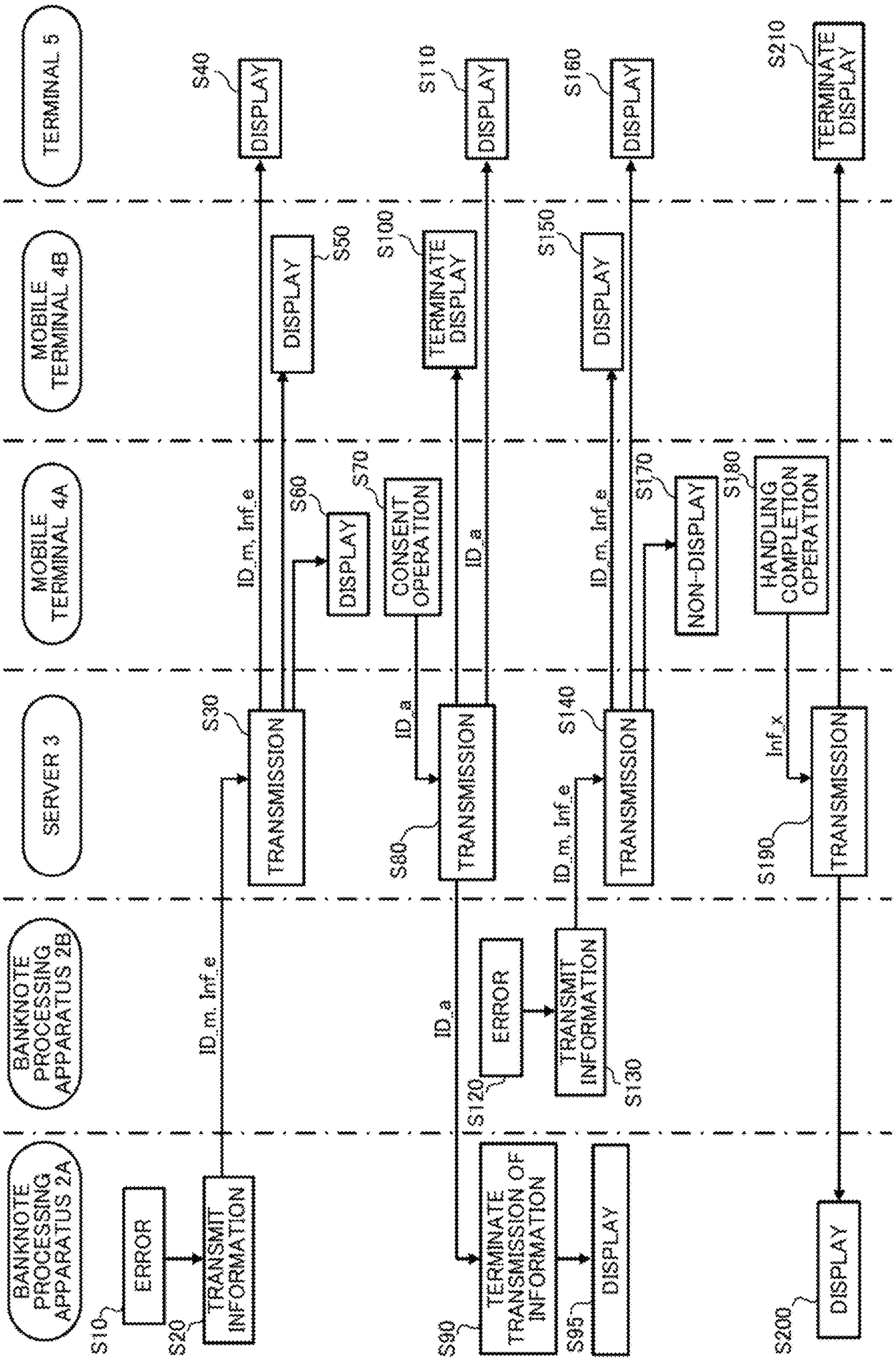
FIG. 2 is a sequence illustrating an example of a method for handling an error in a banknote processing machine of the embodiment of the present disclosure.

A method for handling an error in the banknote processing apparatus of the embodiment of the present disclosure will be described with reference to FIG. 2. FIG. 2 is a sequence illustrating an example of the method for handling an error in the banknote processing machine of the embodiment of the present disclosure.

Hereinafter, a case will be described as an example in which an error occurs in the banknote processing apparatus 2A and consent information on consent to handling of the error is transmitted from the banknote processing apparatus 2A.

First, in step S10, an error occurs in the banknote processing apparatus 2A. In step S20, apparatus information ID_m of the banknote processing apparatus 2A and error information Inf_e indicating an error type are transmitted from the banknote processing apparatus 2A to the server 3.

These pieces of information ID_m and information Inf_e are transmitted from the server 3 to the mobile terminal 4A, the mobile terminal 4B and the terminal 5 in step S30, and are displayed on the mobile terminal 4A, the mobile terminal 4B and the terminal 5 in steps S40, S50, and S60.

In step S70, the mobile terminal 4A that has received a consent operation by a bank clerk A who has viewed the displays of the information ID_m and the information Inf_e transmits bank clerk information ID_a of the bank clerk A to the server 3. The bank clerk information ID_a also serves as consent information.

In step S80, the consent information (the bank clerk information ID_a of the bank clerk A) is transmitted from the server 3 to the banknote processing apparatus 2A, the mobile terminal 4B, and the terminal 5, respectively.

In the banknote processing apparatus 2A that has received the consent information, the transmission of the information ID_m and the information Inf_e is terminated in step S90, and it is displayed in step S95 that a bank clerk comes to the banknote processing apparatus 2A. Note that, the bank clerk A may use the banknote processing apparatus 2A to select guidance that an error suitable for the error information Inf_e is corrected by operating the banknote processing apparatus 2A and send the guidance to the banknote processing apparatus 2A via the server 3. In this case, in step S95, the guidance is displayed instead of or together with the display to the effect that a bank clerk comes to the banknote processing apparatus 2A.

In the mobile terminal 4B that has received the consent information, the display of the information ID_m and the information Inf_e, that is, the display to the effect that an error has occurred in the banknote processing apparatus 2A is terminated in step S100. Thus, the bank clerk B is notified that processing of receiving consent to error handling in the banknote processing apparatus 2A is terminated. Alternatively, the bank clerk B may also be notified that the bank clerk A other than the bank clerk B handles the error in the banknote processing apparatus 2A, e.g. by displaying the bank clerk information ID_a of the bank clerk A side by side with the information ID_m and the information Inf_e without erasing the display of the information ID_m and the information Inf_e.

In the terminal 5 that has received the consent information, the bank clerk information ID_a of the bank clerk A is displayed in step S110. Thus, an administrator is notified that the bank clerk A performs error handling in the banknote processing apparatus 2A.

After the consent information is transmitted from the mobile terminal 4A in step S70, an error occurs in the banknote processing apparatus 2B in step S120, and apparatus information ID_m of the banknote processing apparatus 2B and error information Inf_e of the banknote processing apparatus 2B are transmitted from the banknote processing apparatus 2B to the server 3 in step S130.

In step S140, these pieces of information ID_m and information Inf_e are transmitted from the server 3 to the mobile terminal 4A, the mobile terminal 4B and the terminal 5. In the mobile terminal 4B and the terminal 5, these pieces of information ID_m and information Inf_e are displayed in steps S150 and S160. In the mobile terminal 4A, on the other hand, the information ID_m and the information Inf_e are prohibited from being displayed in step S170. That is, the mobile terminal 4A does not notify that an error has occurred in the banknote processing apparatus 2B. Thus, the bank clerk A can concentrate on error handling in the banknote processing apparatus 2A.

Note that, in step S170, instead of prohibiting the information ID_m and the information Inf_e from being displayed, the controller 40 of the mobile terminal 4A may control the touch screen 42 such that the touch screen 42 is prohibited from receiving a consent operation with respect to an error of the banknote processing apparatus 2B.

In step S180, when the mobile terminal 4A receives a handling completion operation, error correction information Inf_x is transmitted to the server 3.

In step S190, the error correction information Inf_x is transmitted from the server 3 to the banknote processing apparatus 2A and the terminal 5. In step S200, it is displayed in the banknote processing apparatus 2A that the error has been corrected. In a case where an indication lamp configured to notify an occurrence of an error is comprised in the banknote processing apparatus 2A and is lit, the indication lamp is turned off. In step S210, the displays of the information ID_m and the information Inf_e are deleted from the terminal 5. That is, the information on the corrected error no longer needs to be managed and is therefore excluded from information to be managed. Note that, in step S210, it may also be configured such that the displays of the information ID_m and the information Inf_e are not erased and that these pieces of information ID_m and information Inf_e are displayed side by side with a display to the effect that the error has been corrected.

[3. Working Effects]

According to the embodiment of the present disclosure, the following effects can be obtained.

(1) State information (that is, error information Inf_e) transmitted from the banknote processing apparatus 2 is transmitted to the mobile terminal 4, and the state information is displayed on the touch screen 42 of the mobile terminal 4. Accordingly, in a case where an error occurs in the banknote processing apparatus 2, a bank clerk can realize the error and quickly handle the error in the banknote processing apparatus 2. Further, since error information Inf_e is displayed on the touch screen 42 of the mobile terminal 4, a bank clerk who performs the error handling can prepare in advance things (for example, tools or manuals) necessary for the error handling in accordance with the error type or can determine whether the bank clerk is able to handle the error with his/her authority, experience, or skill in accordance with the content indicated by error information Inf_e.

Further, when a bank clerk confirms the state information and operates the mobile terminal 4 such that the mobile terminal 4 transmits bank clerk information ID_a that also serves as consent information, the bank clerk information ID_a is transmitted to the terminal 5 for an administrator. When the communication section 51 of the terminal 5 receives the bank clerk information ID_a, the received bank clerk information ID_a is displayed on the touch screen 52.

Accordingly, an administrator can grasp whether a bank clerk handles an error in the banknote processing apparatus 2. Accordingly, in a case where an error is left unhandled, an administrator can quickly handle the error, e.g. via the mobile terminal 4 or by directly requesting a bank clerk to perform error handling.

(2) For example, even when an error occurs in the banknote processing apparatus 2B, the mobile terminal 4A does notify the error in the banknote processing apparatus 2B or the mobile terminal 4A is prohibited from receiving consent information with respect to the error between transmission of bank clerk information ID_a as consent information with respect to an error in the banknote processing apparatus 2A from the mobile terminal 4A and correction of the error. Accordingly, the bank clerk A who uses the mobile terminal 4A can concentrate on handling of the error in the banknote processing apparatus 2A.

(3) Since bank clerk information ID_a is displayed on the terminal 5, an administrator can specify a bank clerk who handles an error. Accordingly, the administrator determines whether it is appropriate that the bank clerk handles the error, and in a case where the administrator determines that it is not appropriate that the bank clerk handles the error, the administrator can take a proper measure such as requesting support from another bank clerk. Further, an administrator can manage and evaluate the work of bank clerks.

(4) When the banknote processing apparatus 2 receives bank clerk information ID_a as consent information from the mobile terminal 4, the banknote processing apparatus 2 displays error handling information on the operation display 21. The error handling information is, for example, guidance handling the error or a notification of a visit of a bank clerk to the banknote processing apparatus 2 for handling the error. Since an operator (a customer in the present embodiment) of the banknote processing apparatus 2 is notified of such error handling information, it is possible to reduce anxiety of the operator associated with an error in the banknote processing apparatus 2.

(5) Each intercommunication among the banknote processing apparatus 2, the mobile terminal 4, and the terminal 5 is performed via the server 3, respectively. Accordingly, the banknote processing apparatus 2, the mobile terminal 4, and the terminal 5 may transmit information only to the server 3, respectively, and the destination of information is appropriately selected by the server 3 in accordance with the content of the information. Accordingly, it is possible to simplify control relating to communication of the banknote processing apparatus 2, the mobile terminal 4, and the terminal 5. Further, since each information of the banknote processing apparatus 2, the mobile terminal 4, and the terminal 5 is aggregated in the server 3, it is possible to perform notification in accordance with the operating situation of the banknote processing system 1 in its entirety.

(6) The mobile terminal 4 comprises, as an alarm, the vibrator 43 that vibrates when the mobile terminal 4 receives error information Inf_e. Accordingly, it is possible to restrain a bank clerk from becoming unaware of reception of error information Inf_e by of the mobile terminal 4 even in a situation in which the bank clerk only carries the mobile terminal 4 and does not look at the touch screen 42, that is, even in a situation in which the bank clerk does not pay special attention to the mobile terminal 4.

(7) The banknote processing apparatus 2 is an apparatus which is disposed in a bank lobby and which is operated by a customer himself/herself. That is, an operator of the banknote processing apparatus 2 is a customer of a bank unfamiliar with operation of the banknote processing apparatus 2. Thus, quick handling of an error in the banknote processing apparatus 2 by a bank clerk appears as a more remarkable effect.

(8) When a person in charge of error handling in the banknote processing apparatus 2 is decided, other persons in charge are notified of the decision. Accordingly, it is possible to restrain other banks clerk from attempting the same error handling unnecessarily, such as a number of bank clerks more than necessary visiting the banknote processing apparatus 2 in which an error has occurred.

[4. Variation]

(1) For example, it may also be configured such that even after consent information with respect to an error in the banknote processing apparatus 2A is transmitted from the mobile terminal 4A, the mobile terminal 4A receives a consent operation with respect to an error in the banknote processing apparatus 2B. Thus, the bank clerk A can handle an error in the banknote processing apparatus 2B on an ad hoc basis. For example, in a case where the banknote processing apparatus 2A and the banknote processing apparatus 2B are arranged very close to each other and error handling in the banknote processing apparatus 2A by the bank clerk A is near completion, it is efficient to cause the bank clerk A to address an error in the banknote processing apparatus 2B.

(2) Each intercommunication among the banknote processing apparatus 2, the mobile terminal 4, and the terminal 5 may not be performed via the server 3.

Figure 3:
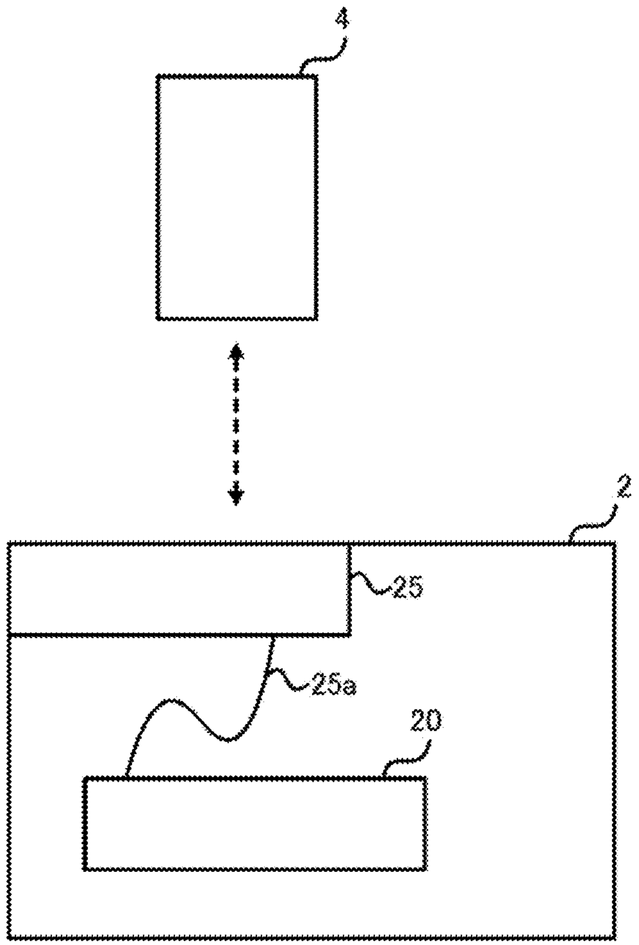
FIG. 3 is a schematic diagram illustrating a configuration of a variation of the banknote processing system of the embodiment of the present disclosure.

(3) FIG. 3 is a schematic diagram illustrating a configuration of a variation of the banknote processing system of the embodiment of the present disclosure. In the variation illustrated in FIG. 3, it is detected by using NFC [Near Field Communication] instead of the beacon 24 that the mobile terminal 4 is at a short distance from the mobile terminal 4. Specifically, the mobile terminal 4 comprises an NFC function, and the banknote processing apparatus 2 comprises an NFC reader/writer 25. The NFC reader/writer 25 is connected to the controller 20 via a USB cable **25*a***.

The NFC reader/writer 25 is detachable from its standard attachment position in the banknote processing apparatus 2. Further, the length of the USB cable **25*a* is set to be longer than a length required to connect the NFC reader/writer 25 at the standard attachment position described above to the controller 20. Accordingly, in an environment where it is difficult to use the NFC reader/writer 25 at the standard attachment position, the NFC reader/writer 25** can be detached from the standard attachment position and be disposed at a more preferable position.

Note that, since other configurations are the same as those in the embodiment described above, descriptions thereof will be omitted.

This application is a continuation (in-part) of International Patent Application No. PCT/JP2019/042254, filed on Oct. 29, 2019, the disclosure of which is incorporated herein by reference in its entirety. International Patent Application No. PCT/JP2019/042254 is entitled to (or claims) the benefit of Japanese Patent Application No. 2018-204117, filed on Oct. 30, 2018, the disclosure of which is incorporated herein by reference in its entirety.

INDUSTRIAL APPLICABILITY

The present disclosure is applicable to a system using a money processing apparatus exemplified by a banknote processing apparatus. The industrial applicability of the present disclosure is therefore large.

REFERENCE SIGNS LIST

1 Banknote processing system (money processing system)
2 Banknote processing apparatus (money processing apparatus)
2A Banknote processing apparatus (first money processing apparatus)
2B Banknote processing apparatus (second money processing apparatus)
3 Server
4, 4A, 4B Mobile terminal (first terminal)
5 Terminal (second terminal)
20 Processing machine controller
21 Operation display (processing machine alarm)
22 Processing machine communication section
23 Detector
24 Beacon
25 NFC reader/writer
25*a* USB cable
26 Inlet
27 Outlet
28 Reject port
30 Server controller
31 Storage
32 Server communication section
40 First controller
41 First communication section
42 Touch screen
43 Vibrator
44 Speaker
50 Second controller
51 Second communication section
52 Touch screen
54 Speaker
ID_a Bank clerk information, consent information
ID_m Apparatus information (specific information)
Inf_e Error information
Inf_x Error correction information

The invention claimed is:

1. A money processing system, comprising:
a money processing machine comprising a processing machine transmitter and receiver and a processing machine controller;
a first terminal comprising:
a first touch display that receives an input operation,
a first transmitter and receiver which performs communication,
a first controller, and
a first alarm that notifies information, wherein the first terminal is a mobile communication terminal operated by a first staff; and
a second terminal comprising:
a second touch display that receives input operation,
a second transmitter and receiver which performs communication, and
a second controller, wherein the second terminal is operated by a second staff, wherein:
the processing machine controller controls the processing machine transmitter and receiver to transmit state information indicating a state of the money processing machine,
in a case where the first touch display receives a consent operation input by the first staff and indicating that the first staff handles an error in the money processing machine, the first controller controls the first transmitter and receiver to transmit consent information, the error being indicated as the state information of the money processing machine,
the second controller controls the second transmitter and receiver to receive the consent information so as to notify the second staff that the first staff is to handle the error in the money processing machine,
in a case where the first transmitter and receiver receives the state information, the first controller controls the first alarm to notify the state information, and
after the first touch display receives the consent operation with respect to the money processing machine,
the first controller controls the first alarm such that the first alarm does not notify the state information from a processing machine transmitter and receiver of another money processing machine, or
the first controller controls the first touch display such that the first touch display is prohibited from receiving the consent operation with respect to the another money processing machine.

2. The money processing system according to claim 1, wherein:
the first alarm comprises a vibrator, and
in a case where the first transmitter and receiver receives the state information, the first controller controls the vibrator to vibrate.

3. The money processing system according to claim 1, wherein after the first touch display receives the consent operation with respect to the first money processing machine, the first controller allows the first touch display to receive the consent operation with respect to the another money processing machine.

4. The money processing system according to claim 1, wherein:
the second terminal comprises a second alarm that notifies information,
the first terminal transmits specific information specifying a user of the first terminal, and
in a case where the second transmitter and receiver receives the consent information and the specific information, the second controller controls the second alarm to notify the specific information.

5. The money processing system according to claim 1, wherein:
at least one of the money processing machine and the another money processing machine comprises a processing machine alarm, and
in both cases where the processing machine controller determines that the state information indicates the error in the money processing machine, and where the processing machine controller receives the consent information from the first terminal, the processing machine controller controls the processing machine alarm to notify error handling information that is information related to handling of the error.

6. The money processing system according to claim 5, wherein:
the processing machine alarm comprises a display, and
the processing machine controller controls the display to display the error handling information.

7. The money processing system according to claim 1, wherein:
at least one of the money processing machine and the another money processing machine comprises at least one of an inlet and an outlet, and the error is an error indicating that depositing processing is not allowed with the corresponding money processing machine, or the error is an error indicating that dispensing processing is not allowed with the money processing machine.

8. The money processing system according to claim 1, further comprising:

a server, wherein the first terminal, the second terminal and at least one of the money processing machine and the another money processing machine perform communication with each other via the server.

9. The money processing system according to claim 1, wherein at least one of the money processing machine and the another money processing machine is disposed in a lobby of a bank.

10. A method for handling an error in a money processing machine, the method comprising:

transmitting, by a money processing machine, state information indicating a state of the money processing machine, wherein the money processing machine includes a touch display, a transmitter and receiver, a controller and an alarm;

transmitting, by a first terminal operated by a first staff, consent information in a case where the first terminal receives a consent operation inputted by the first staff and indicating that the first staff handles an error in the money processing machine after reception of the state information, the first terminal being a mobile communication terminal, the error being indicated as the state information of the money processing machine;

receiving, by a second terminal being operated by a second staff, the consent information so as to notify the second staff that the first staff is to handle the error in the money processing machine;

in a case where the state information is received, controlling the alarm to notify—the state information;

after the touch display receives the consent operation with respect to the money processing machine:

controlling the alarm such that the alarm does not notify the state information from a processing machine transmitter and receiver of another money processing machine, or controlling the touch display such that the touch display is prohibited from receiving the consent operation with respect to the another money processing machine.

* * * * *